No. 894,327. PATENTED JULY 28, 1908.
J. JOHNSTON & H. W. BUDDICOM.
CHANGE SPEED GEAR.
APPLICATION FILED MAY 9, 1905.

3 SHEETS—SHEET 1.

Witnesses:—

Inventors:—
J. Johnston
and H. W. Buddicom
by H. B. Willson & Co.
Attorneys

No. 894,327. PATENTED JULY 28, 1908.
J. JOHNSTON & H. W. BUDDICOM.
CHANGE SPEED GEAR.
APPLICATION FILED MAY 9, 1905.

UNITED STATES PATENT OFFICE.

JOHN JOHNSTON, OF PUTNEY, LONDON, AND HARRY WILLIAM BUDDICOM, OF NANNERCH, NEAR MOLD, ENGLAND.

CHANGE-SPEED GEAR.

No. 894,327.  Specification of Letters Patent.  Patented July 28, 1908.

Application filed May 9, 1905. Serial No. 259,622.

*To all whom it may concern:*

Be it known that we, JOHN JOHNSTON and HARRY WILLIAM BUDDICOM, subjects of the King of Great Britain and Ireland, and residing at 3 Ruvigny Mansions, Putney, London, S. W., England, and Penbedw, Nannerch, near Mold, in the county of Flint, North Wales, respectively, have invented certain new and useful Improvements in Change-Speed Gear, of which the following is a specification.

This invention relates to change speed gear for use upon motor driven vehicles and other purposes and of the type wherein the power from the motor shaft is transmitted to the driven shaft through sets of sun and planet gear of different values some of the sun wheels of which are adapted to be respectively retarded to give changes in speed or direction.

The object of this invention is to provide a gear of this type which is compact in arrangement, efficient in action and can be incased within an oil tight casing so that the whole of the gearing is continuously running in oil thus obviating the many difficulties due to insufficient lubrication which are so often met with in change speed gears as hitherto constructed.

According to this invention the motion from the motor shaft to the driven shaft for the highest speed is transmitted through a clutch mounted on one of the elements of the gear which will cause the latter to rotate "en bloc" when the clutch is engaged, while the lower speeds and reverse are obtained through sets of sun and planet motions preferably in the form of bevel sun wheels and bevel planet pinions, some of the sun wheels being provided with brake surfaces by which they may be held stationary or retarded to effect the desired change in speed or direction. The sun wheels are provided with comparatively long hub sleeves for carrying the brakes so that all the wheels and pinions may be incased in a compact manner within an oil tight casing, the brakes and the clutch being outside the same.

Figure 1:
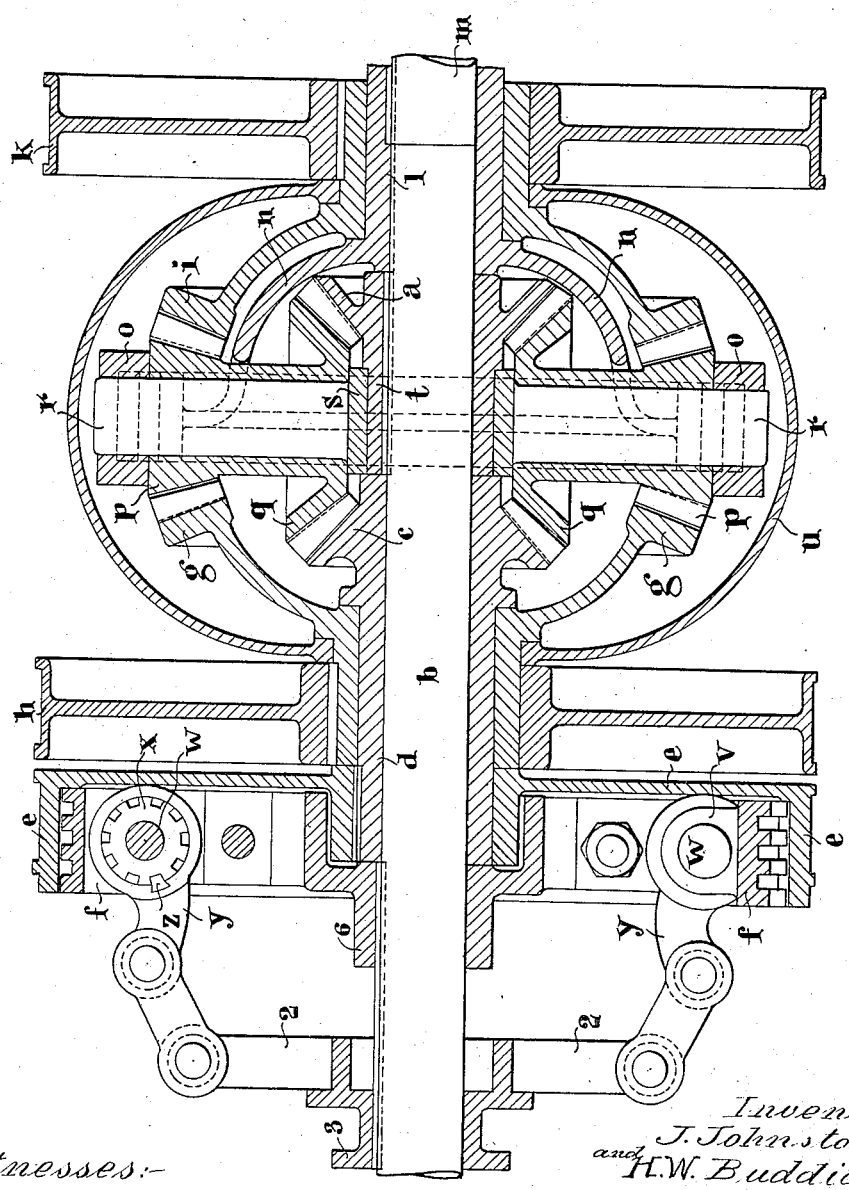
Figure 2:
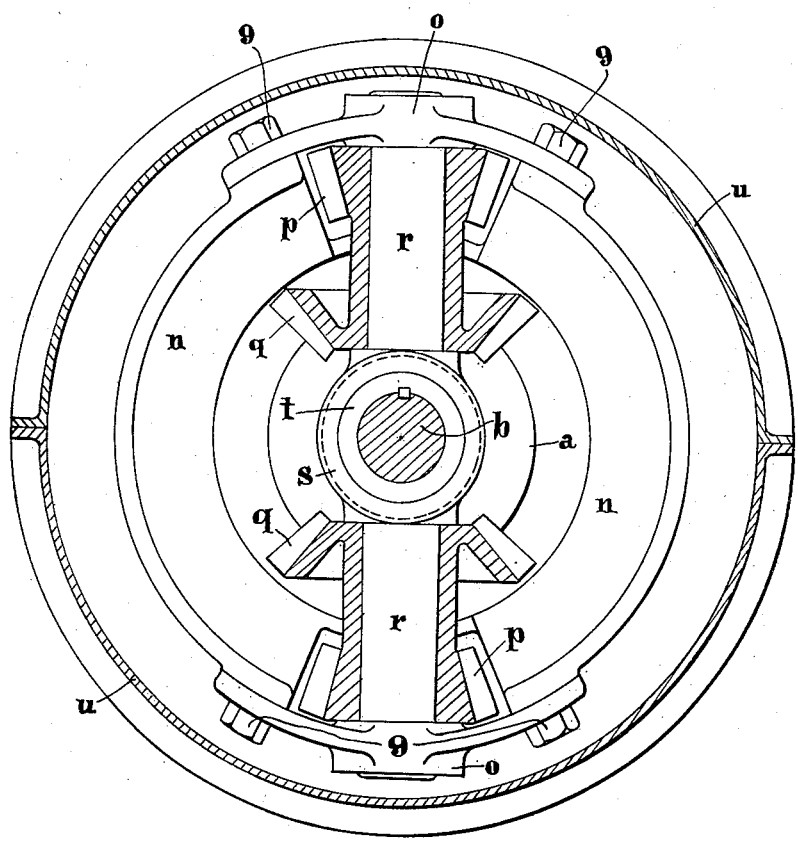
Figure 3:
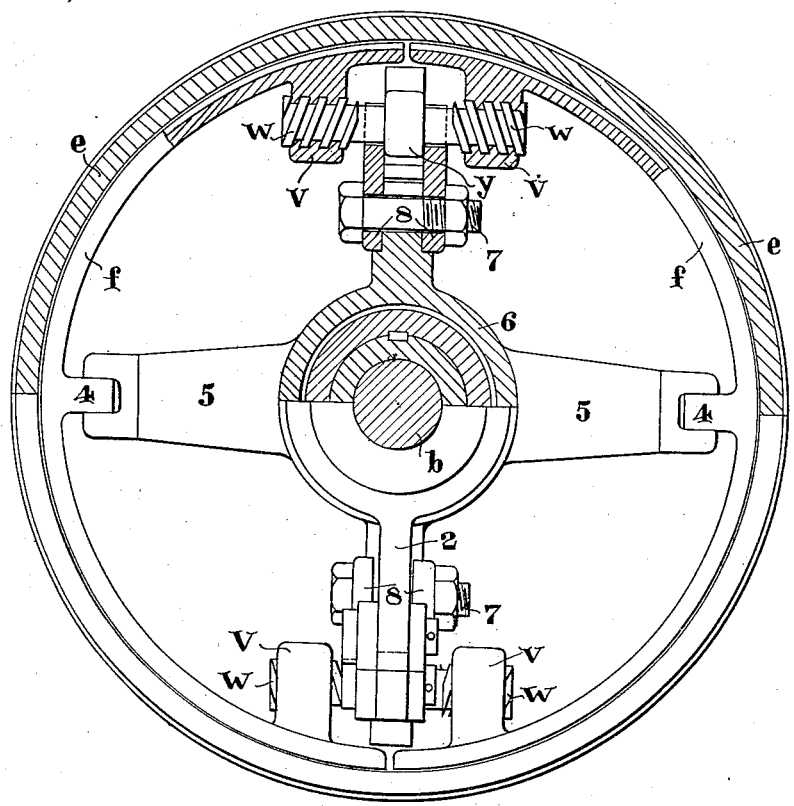

In the accompanying drawings, Figures 1 and 2 are respectively longitudinal and transverse sections of a gear according to the invention, Fig. 3 is an end view partly in section showing the clutch-operating mechanism.

In carrying out the invention according to one mode as in the application to a three speed and reverse gear, a small sun bevel wheel or sun pinion, $a$, is keyed or pinned to the driving shaft, $b$. A second sun bevel wheel or pinion $c$ of equal diameter but with teeth oppositely arranged in relation to the first $a$, is loosely mounted on the same shaft $b$. These two sun wheels $a$ and $c$ are hereinafter referred to as the fixed and loose sun pinions respectively. Upon the outer end of the extended hub sleeve $d$ of the loose sun pinion $c$ is rigidly mounted one element $e$ of an expanding or other clutch forming also a brake drum hereinafter referred to as the second speed drum, preferably acting as a brake drum on its outer periphery and a clutch surface on its inner periphery adapted to be engaged by a clutch member $f$ on the driving shaft $b$. Loosely mounted on the same journal $d$ is a sun wheel $g$, also having a brake drum $h$ rigidly mounted on its extended hub sleeve, this drum being hereinafter referred to as the third speed drum. A sun wheel $i$, of equal diameter to the one $g$ just referred to but with oppositely arranged teeth is loosely mounted at the opposite side of the gear and has a brake drum $k$ on its hub sleeve, referred to hereinafter as the reverse drum. The latter sun wheel $i$ runs loosely on a sleeve $l$ which is pinned or keyed to the driven shaft $m$ and is loose on the driving shaft $b$. From this sleeve $l$ a number of radiating arms or a concave disk $n$ extends having a circumferential flange to which the collars $o$ are attached by screws 9, the collars embracing the ends of radial pins $r$ on which latter double planet pinions $p$, $q$, are mounted. The planet pinions are adapted to engage and connect the sun wheels and pinions, and the radial arms or concave disk $n$ forms a driving member for transmitting the torque from the planet pinions to the driven shaft. The planet pinions are double or in pairs, the pinions of each pair being rigidly secured together by a sleeve. That is, each has a pinion $p$ meshing between the two sun wheels $g$ and $i$, and a pinion $q$ meshing between the sun pinions $c$ and $a$. The planet pinions are as before stated supported on radial pins $r$ carried by or extending from a collar $s$ loosely mounted on the hub sleeve $t$ of the fixed sun pinion, $a$, the planet pinions running loosely on the pins. The whole of the gearing is incased by a suitable oil-tight casing $u$, so that it runs continuously in an oil bath.

In operation the highest speed is obtained by engaging the clutch $f, e$, when the gear rotates "en bloc" and the driven shaft $m$ has the same speed as the motor shaft $b$. For the second speed the clutch is released and the brake applied to the second speed drum $e$. This retards or holds the loose sun pinion $c$ stationary and the fixed sun pinion $a$ drives the planet pinions $q$ and causes them to make an orbital movement resulting in a somewhat lower speed of the driven shaft $m$ in the ahead direction. The third speed ahead is obtained by releasing the second speed drum $e$ and applying the brake to the third speed drum $h$ to retard or hold the loose sun wheel $g$ stationary. The fixed sun pinion $a$ still imparts an orbital movement to the planet pinions $q$ but a still lower speed is imparted to the driven shaft $m$. The reverse is obtained by freeing the third speed drum $h$ and braking the reverse drum $k$ which retards or holds the other and opposite sun wheel $i$ stationary so that although the planet pinions $p$ and $q$ still have an orbital movement it is in the reverse direction resulting in a reverse drive to the driven shaft $m$.

It is to be understood that any of the speeds can be applied as desired without passing through the others in rotation. It is to be understood that the number of sets of planet pinions and sun wheels may be varied to suit the number of speeds required and that the invention is not confined to the exact method of mounting the gears hereinbefore referred to by way of example.

A convenient form of clutch is illustrated in Figs. 1 and 3. The expanding ring $f$ is split diametrically, and at the split ends, has lugs $v$ $v$ screw-threaded to receive right and left hand threaded pins $w$ $w$, double threads being preferred. The pins $w$ are provided with ratchet or notched collars $x$ rigidly mounted thereon. Small levers $y$ are loosely mounted on the collars $x$ but are adjustably secured thereon by feathers $z$. Initial adjustment is effected by removing the bolt 7 and side plates 8 and then slipping the levers $y$ off the notched collars $x$, rotating the same until another notch in each comes opposite its respective feather when the levers and plates can be replaced. The levers $y$ are linked to radial arms 2 rigidly mounted on a collar 3 keyed but adapted to slide on the driving shaft $b$. The parts of the expanding ring $f$ also have lugs 4 which engage within the ends of the radial arms 5 extending from the hub sleeve 6.

The clutch is engaged by sliding the collar 3 in the direction indicated by the arrow which results in an expansion of the ring $f$, an opposite movement of the collar 3 effecting a contraction of the ring and therefore release of the clutch.

Having thus described our invention, what we claim as new and desire to secure by Letters Patent is:—

A change speed gear comprising a driving shaft, two sun bevel pinions, one loose on and one keyed to, the driving shaft, sun bevel wheels loosely mounted and having concave webs and sleeves integral with said webs, a sleeve integral with the loose sun pinion, planet pinions meshing with the sun wheels and pinions, radial pins for said planet pinions, a concave member keyed to the driven shaft and having bosses for supporting the outer ends of the pins, a sleeve integral with the inner ends of the latter, a light casing inclosing the gear wheels and pinions, and brake drums outside the casing and mounted on the sleeves of the sun wheels and of the loose sun pinion, said sleeves extending through said casing, substantially as hereinbefore set forth.

In witness whereof I the said JOHN JOHNSTON have signed my name to this specification in the presence of two subscribing witnesses.

JOHN JOHNSTON.

Witnesses:
FRANCIS J. BIGNELL,
BERTRAM H. MATTHEWS.

In witness whereof I the said HARRY WILLIAM BUDDICOM have signed my name to this specification in the presence of two subscribing witnesses.

HARRY WM. BUDDICOM.

Witnesses:
C. W. DIGBY,
ALBERT AMEGLIO.